United States Patent [19]

Hynecek et al.

[11] Patent Number: 5,278,656
[45] Date of Patent: Jan. 11, 1994

[54] IMAGING SYSTEM PROVIDING AMPLIFIED ELECTRICAL IMAGE SIGNAL WITH INHIBITED HEAT BUILDUP FOR VISUAL DISPLAY INPUT

[75] Inventors: Jaroslav Hynecek, Richardson, Tex.; Masao Uehara, Tokyo, Japan

[73] Assignees: Texas Instruments Incorporated, Dallas, Tex.; Olympus Optical Co., Ltd., Tokyo, Japan

[21] Appl. No.: 619,629

[22] Filed: Nov. 28, 1990

[30] Foreign Application Priority Data

Dec. 4, 1989 [JP]  Japan .................................. 1-317127

[51] Int. Cl.⁵ .............................................. H04N 5/30
[52] U.S. Cl. ...................................... 358/209; 358/98; 358/213.16
[58] Field of Search .................... 358/98, 93, 209, 901, 358/213.16; H04N 7/18

[56] References Cited

U.S. PATENT DOCUMENTS

| | | | |
|---|---|---|---|
| 4,249,266 | 2/1981 | Nakamori | 455/608 |
| 4,743,966 | 5/1988 | Matsuo | 358/98 |
| 4,930,861 | 6/1990 | Okabe | 350/96.25 |
| 4,979,035 | 12/1990 | Uehara et al. | 358/98 |

Primary Examiner—Joseph Mancuso
Assistant Examiner—Tuan V. Ho
Attorney, Agent, or Firm—William E. Hiller; Richard L. Donaldson

[57] ABSTRACT

For a buffer amplifier provided near a solid state imaging device for photoelectrically converting an optical image by an image forming optical system and amplifying the signal of the output end, the temperature rise of the solid state imaging device is reduced by reducing the electric power consumption in a non-signal reading out period in which no driving signal is applied against a signal reading out period in which an image signal is output from the output end of this solid state imaging device by applying a driving signal to the solid state imaging device.

33 Claims, 10 Drawing Sheets

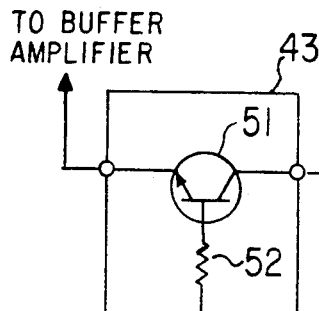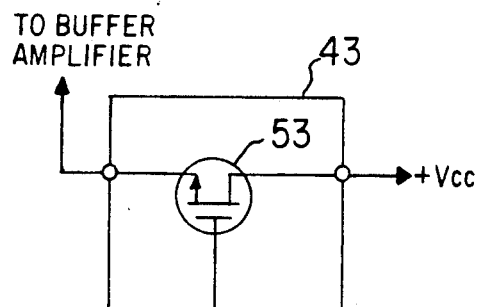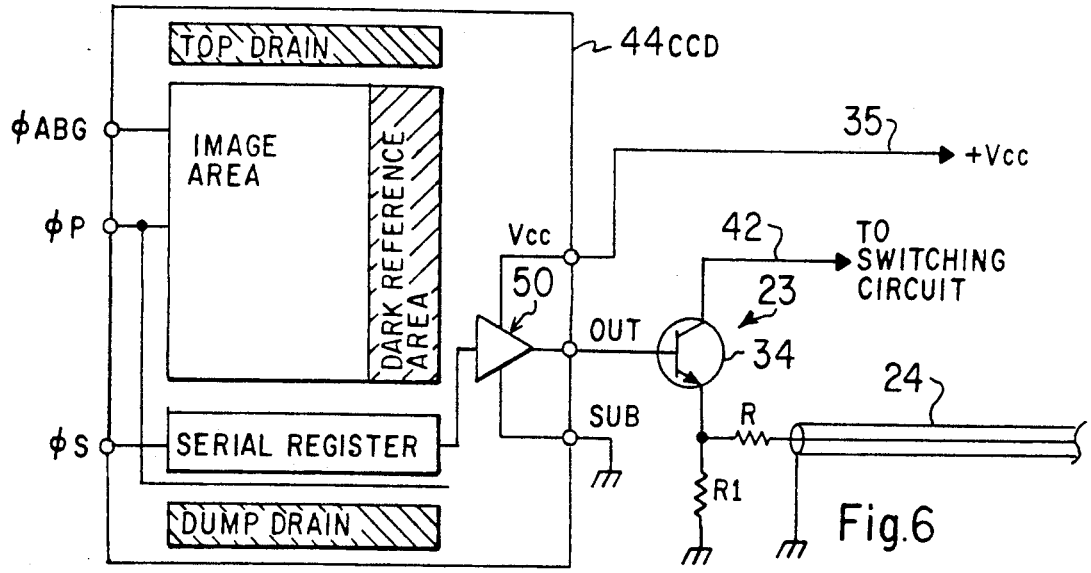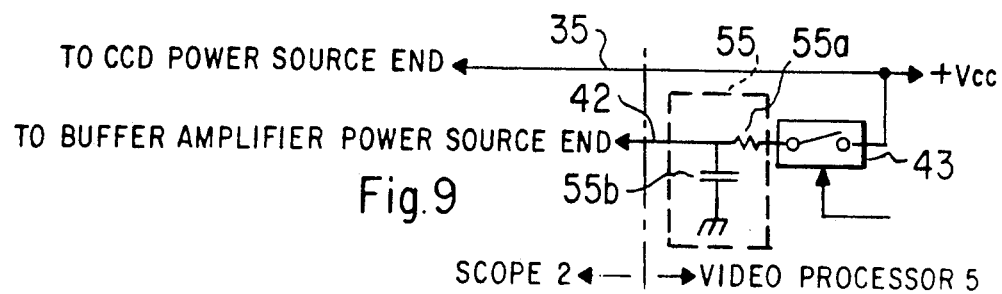

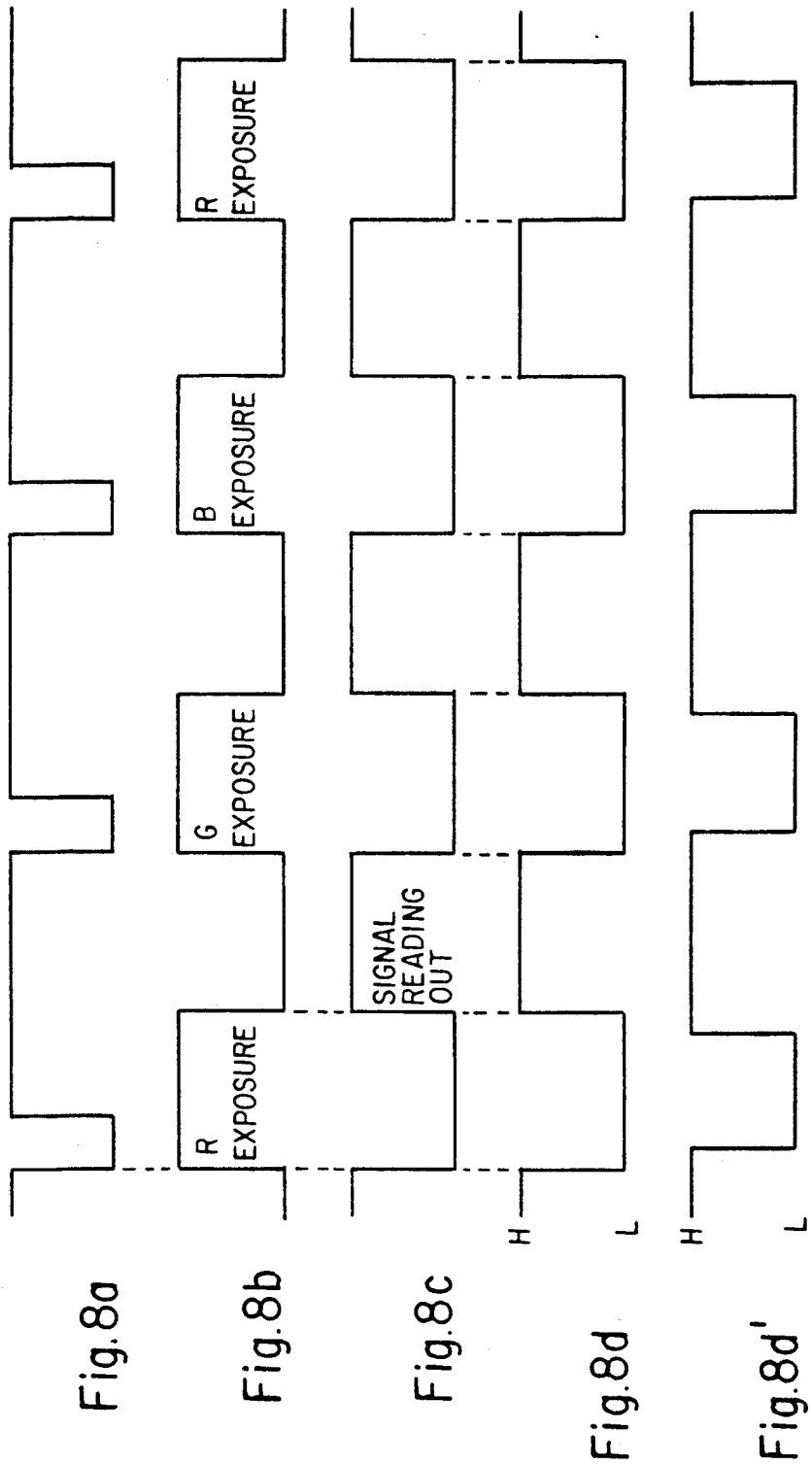

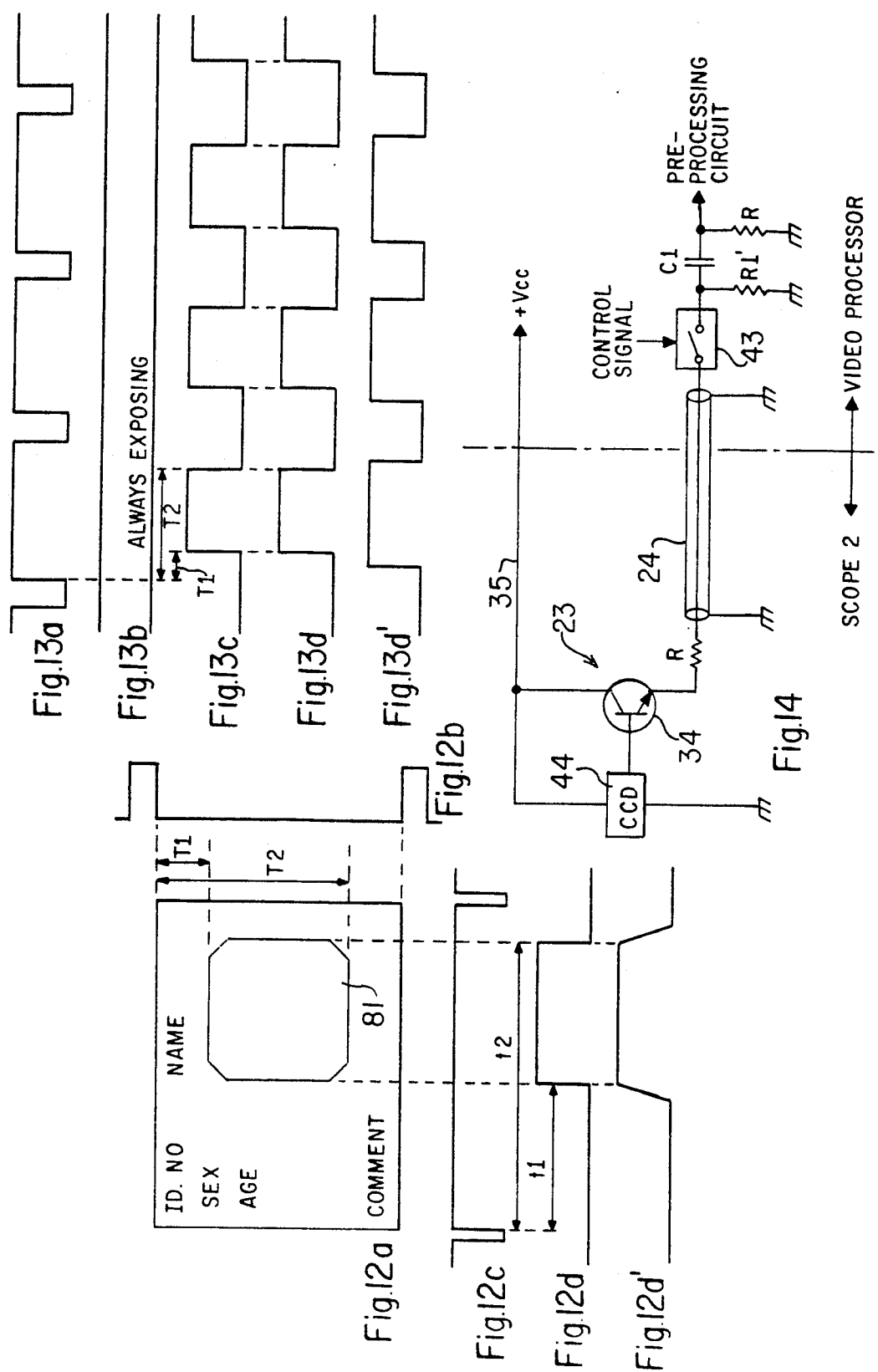

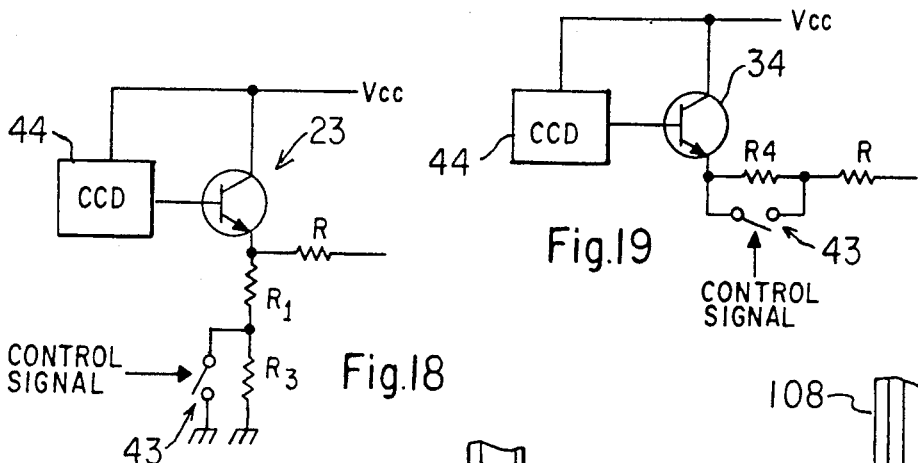
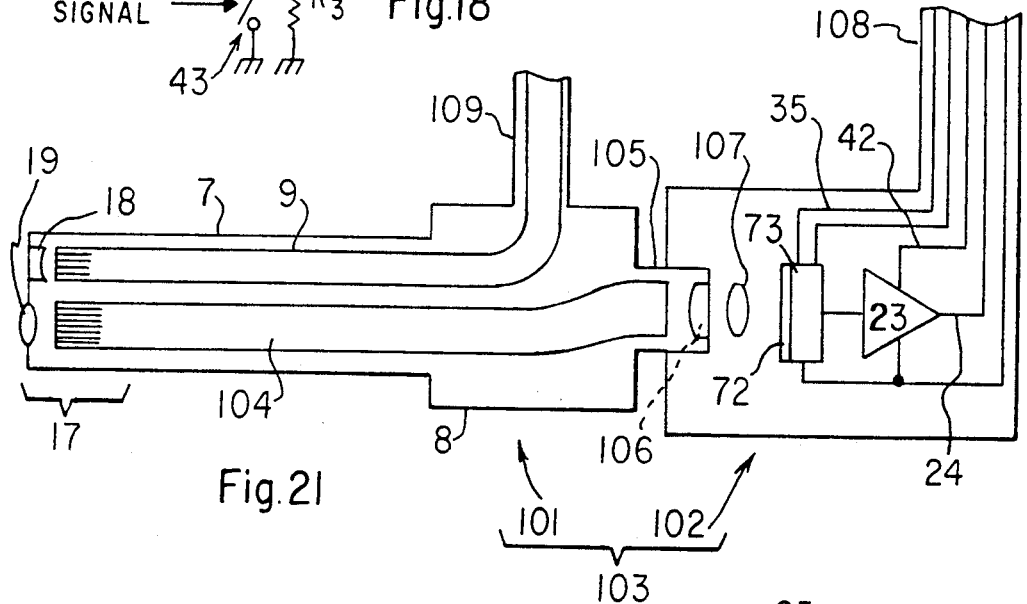
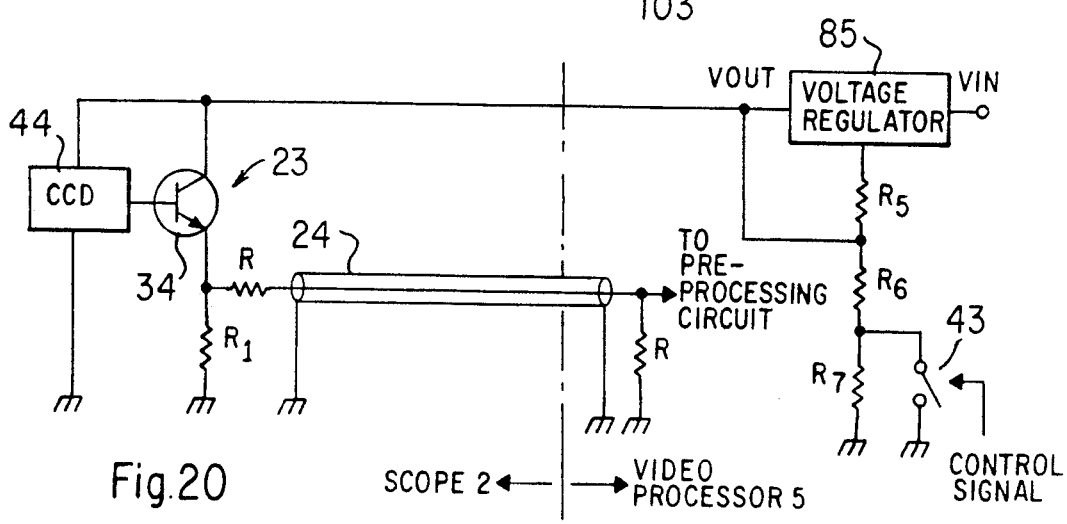

IMAGING SYSTEM PROVIDING AMPLIFIED ELECTRICAL IMAGE SIGNAL WITH INHIBITED HEAT BUILDUP FOR VISUAL DISPLAY INPUT

BACKGROUND OF THE INVENTION

Field of the Invention and Related Art Statement

This invention relates to an imaging system for providing an amplified electrical image signal for input to a visual display, wherein heat buildup in the amplification of the electrical image signal is inhibited by a reduction in the power consumption of an imaging means during periods when no readout of the electrical image signal occurs.

Recently there are suggested various imaging apparatuses each using a solid state imaging device such as a CCD (charge coupled device). There are also suggested various endoscopes each using said solid state imaging device as a special imaging apparatus. In such endoscopes, there is known a method in which a color filter is provided integrally with or separately from the CCD and a method in which three primary color lights are radiated as sequentially switched to the CCD. Their detailed formations are mentioned, for example, in the publications of Japanese Patent Application Laid Open Nos. 65962/1976 and 54933/1980.

Also, the actual fitting around the solid state imaging device of such apparatus and the transmission of an output signal therein are mentioned in detail, for example, in the publications of Japanese Utility Model Application Publication No. 19122/1977 and Japanese Patent Application Laid Open No. 61588/1986.

FIG. 1 shows an electronic endoscope apparatus 1 of a prior art example similar to the one disclosed, for example, in Japanese Patent Application Laid Open No. 65962/1976.

This electronic endoscope apparatus 1 comprises an electronic scope 2, a video processor (called also an apparatus body) 5 having a light source section 3 feeding an illuminating light to this electronic scope 2 and a signal processing section 4 processing the signal for the imaging means of the electronic scope 2 built-in and a color monitor 6 displaying a standard video signal produced by processing the signal in the signal processing section.

Said electronic scope 2 has an elongate insertable section 7 and a thick operating section formed at the rear end of this insertable part 7. A light guide 9 transmitting the illuminating light is inserted through the insertable section 7 so that, when the light guide 9 extended out of the operating section 8 is fitted at the end to the light source section 3, the illuminating light may be fed from the light source section 3.

That is to say, when a white light emitted from a lamp 11 is condensed by a lens 12 and is passed through a rotary filter 14 rotated and driven by a motor 13, color transmitting filters 15R, 15G and 15B transmitting the lights of respective wavelength regions of red (R), green (G) and blue (B) and fitted in the peripheral direction of this rotary filter 14 will be sequentially interposed into the light path and the light will be thereby converted to RGB sequential lights. These RGB (sequential) lights are condensed by a lens 16 and are radiated to the light guide 9 on one end surface. The RGB lights are transmitted by this light guide 9 and are emitted to the object side through an illuminating lens 18 from the end surface on the scope tip section 17 side.

The reflected light from the object is made by an objective lens 19 fitted to the scope tip section 17 to form an object image on a CCD 21 as a solid state imaging device arranged in its focal plane. The object image is photoelectrically converted by the CCD 21 and is stored as an electric charge corresponding to the object image.

In said CCD 21, when a CCD driving signal from a CCD driver 22 within the video processor 5 is applied, an electric charge will be read out. This read-out signal is amplified in the current by a buffer amplifier 23 and is transmitted to a pre-processing circuit 25 within the video processor 5 through a transmitting cable 24 inserted through the scope, that is, the insertable section 7 and the cord extended out of the operating section 8.

In this pre-processing circuit 25, a base band signal is extracted from a signal output from the CCD 21 as synchronized with a horizontal transfer clock of a CCD driving signal and gamma not illustrated within the pre-processing circuit 25 is corrected. This signal having had the gamma corrected is converted to a digital signal by an A/D converter 26 and is sequentially written by a control signal of a controlling section 28 into R, G and B memories 27R, 27G and 27B for synchronization.

For example, the signal photoelectrically converted by the CCD 21 under the illuminating light of red having passed through the red color transmitting filter 15 is written into the R memory 27R.

The respective signals temporarily written into these memories 27R, 27G and 27B are simultaneously read out and are converted to synchronized digital RGB signals which are converted to standard analogue RGB signals by D/A converters 29R, 29G and 29B. These RGB signals are input into enhancing circuits 31R, 31G and 31B for visibly improving the sharpness, are enhanced in the outlines and are then output to a color monitor 6 through buffer amplifiers 32R, 32G and 32B to color-display the object image.

By the way, a synchronizing signal is input into the controlling section 28 from a synchronizing signal generator 33 and the A/D conversion of the A/D converter 26, the reading/writing of the memories 27R, 27G and 27B, the D/A conversion of the D/A converters 29R, 29G and 29B, the rotating speed of the motor 13 and the timing of the driving signal of the CCD driver 22 are controlled as synchronized with this synchronizing signal.

Generally, in the electronic endoscope apparatus including the prior art example shown in this drawing, various parts are diagnosed by inserting the electronic endoscope 2 into a body cavity or are treated by passing a treating instrument or the like through a channel not illustrated provided within the insertable section 7.

So that these functions may be well developed, the outside diameter and rigid part length of the tip section 17 are required to be small and short and therefore the size of the solid state imaging device which can be used is restricted. From this restriction, the number of pixels of the solid state imaging device is also restricted. Also, in order to visibly display such required information as patient data, an object image that is imaged with the solid state imaging device is not displayed on the whole screen at observation monitoring, but the same as in the usual case of this prior art example, a display size of about ½ is used as shown in FIG. 2. By the way, said patient data are simultaneously displayed on the left side in the picture in FIG. 2.

Also, in this prior art example, a so-called frame sequential system wherein three R, G and B primary color lights are sequentially radiated by using a black and white (monochromatic) solid state imaging device (specifically the CCD 21) is adopted. In order to provide a distance range in which the observation can be made with a proper brightness, it is desirable to enlarge the illuminating light amount per frame/field by lengthening the illuminating period. Signals are read at a high speed out of the CCD 21 and the signals read out by shortening the reading period are temporarily written into the R, G and B memories 27R, 27G and 27B for synchronizing the signals read out and are read at a standard video signal speed out of said R, G and B memories 27R, 27G and 27B.

Now, the transmission system of the output signal of the CCD 21 within the scope 2 in FIG. 1 is as in FIG. 3.

The length of the transmitting cable 24 from the scope tip section 17 to the video processor (body apparatus) 5 is usually about 2 to 3 meters. A coaxial cable 24 is used for the transmission for this length with as little deterioration of the characterisitcs as possible. A buffer amplifier 23 comprising an emitterfollower-connected transistor 34 arranged just adjacently to the CCD 21 and an emitter resistance R1 is necessary to drive the readout signal from the CCD 21 through this coaxial cable 24.

The signal output end of the CCD 21 is connected to the base of the transistor 34. The power source end of the CCD 21 and the collector of the transistor 34 are connected to a power source end +Vcc through a power source cable 35.

The characteristic impedance of said coaxial cable 24 is usually about 50 to 75Ω. The resistance R1 interposed between the emitter and one end of the coaxial cable 24 and the resistance R connected between the end part of the coaxial cable 24 on the apparatus body 5 side and ground are matching resistances.

Now, in order to transmit the output signal of the CCD 21 having a band characteristically of several MHz through the cable of 50 to 75Ω, it is necessary to flow an electric current of several mA to several ten mA through the transistor 34 forming the buffer amplifier 23. The power consumption by this current becomes the sum of the consumptions by the transistor 34 and emitter resistance R1, that is, $P = Ic \times Vce + Ie \times R1$ and the generated heat amount brings about a temperature rise of the just adjacently arranged CCD 21. Here, Ic represents a collector current of the transistor 34, Vce represents a voltage between the collector and emitter and Ie represents an emitter current.

Generally, with the temperature rise, a solid state imaging such as the CCD 21 increases the dark current and deteriorates the picture quality. Usually, the operation guaranteeing temperature of this solid state imaging device is an absolute maximum rating of about 55° C. Particularly, in the case of a plurality of horizontal transferring system solid state imaging devices of a high number of pixels, said buffer amplifier 23 will require a plurality of circuits and the temperature range of this maximum rating will be exceeded.

As described above, in the prior art example, there have been problems in that the heat generation by the driving buffer amplifier 23 of the transferring cable 24 will be large, the picture quality will be deteriorated by the increase of the dark current, the temperature range of the absolute maximum rating of the solid state imaging device will be exceeded, the life will be shortened and permanent damage will occur.

OBJECTS AND SUMMARY OF THE INVENTION

An object of the present invention is to provide an imaging system wherein the temperature rise of a solid state imaging device can be inhibited by reducing the heat generation in a buffer means.

Another object of the present invention is to provide an imaging system wherein a picture quality high in the signal/noise ratio is made possible.

A further object of the present invention is to provide an imaging system having favorable characteristics with a low power consumption.

The present invention relates to an imaging system comprising a solid state imaging device, a buffer means provided in the vicinity of said solid state imaging device and a signal transmitting cable transmitting the signal amplified in the current by said buffer means to the signal processing means side, wherein said buffer means is provided with a power consumption inhibiting means for inhibiting the power consumption in the non-reading out period in which no signal is read out of the solid state imaging device so that the temperature rise of the solid state imaging device may be inhibited by reducing the power consumption in the buffer means and the high picture quality may be possible by reducing the dark current.

BRIEF DESCRIPTION OF THE DRAWINGS

FIG. 6 is an internal formation view of the CCD.

FIGS. 7a and 7b are circuit diagrams each showing a specific formation of a switching circuit.

FIGS. 8a-8d' illustrate waveforms of signals produced by the operation of the first embodiment.

FIG. 9 is a circuit diagram showing the peripheral part of a switching circuit in a modification of the first embodiment.

FIG. 12a is an explanatory view showing a monitor picture associated with FIGS. 12b-12d' which illustrate waveforms of signals relating to the operation of the third embodiment.

FIGS. 13a-13d' illustrate waveforms of signals produced by the operation of the third embodiment.

FIG. 14 is a schematic formation view of a signal transmitting system in a fourth embodiment of the present invention.

FIG. 18 is a circuit diagram showing an essential part in a seventh embodiment of the present invention.

FIG. 19 is a circuit diagram showing an essential part in an eighth embodiment of the present invention.

FIG. 20 is a circuit diagram showing an essential part in a ninth embodiment of the present invention.

FIG. 21 is a schematic formation view of a television camera externally fitted scope which can be used instead of the electronic scope in FIG. 11.

DETAILED DESCRIPTION OF THE PREFERRED EMBODIMENTS

Figure 1:
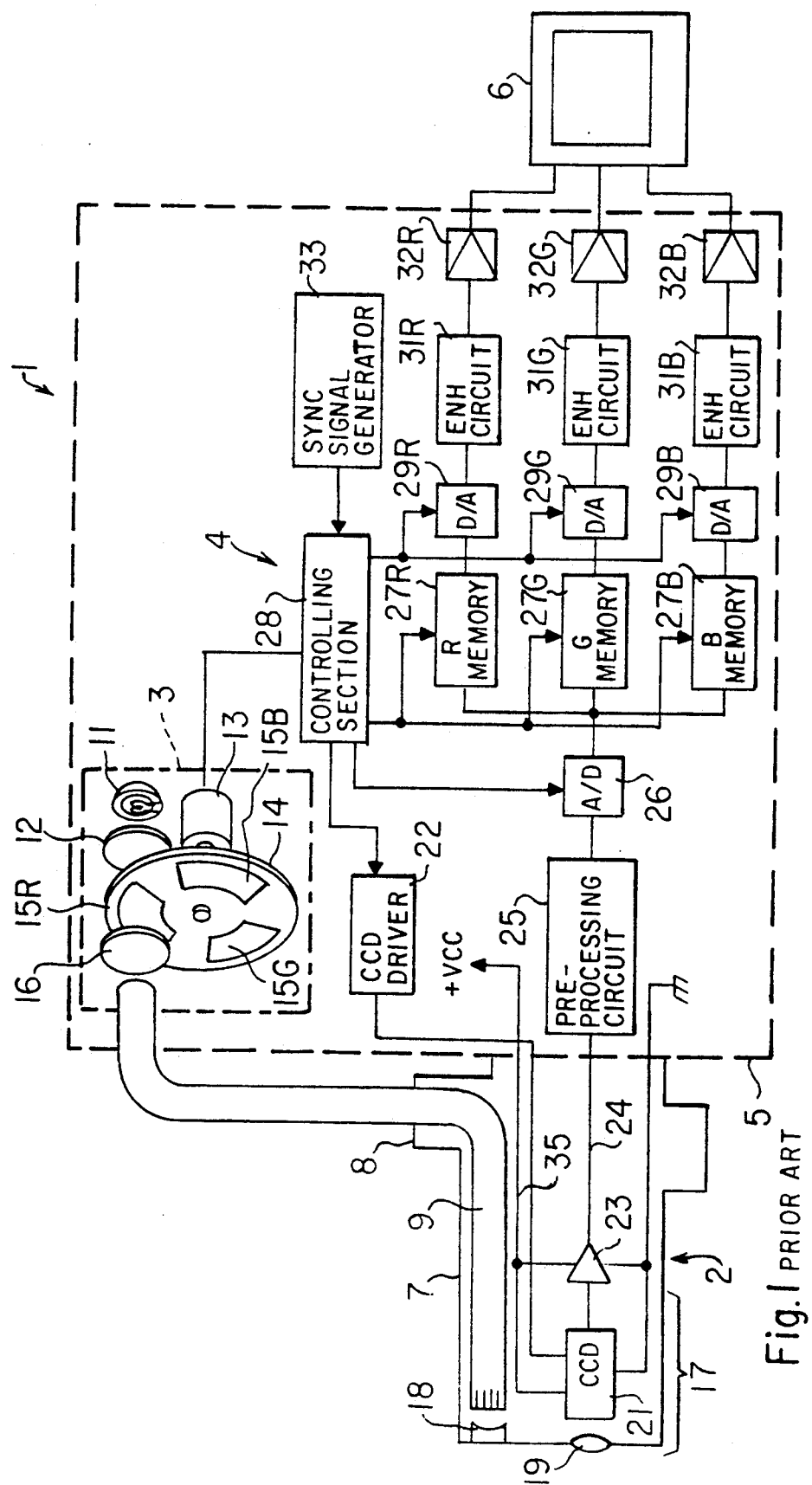
FIG. 1 is a whole formation view of a prior art example.
Figure 2:
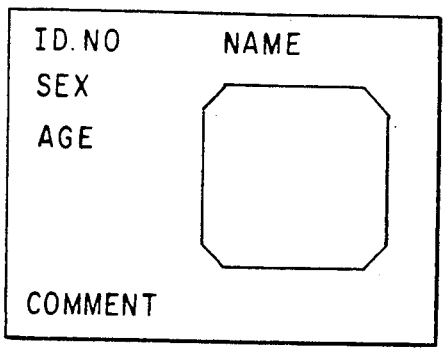
FIG. 2 is an explanatory view showing a monitor display example in the prior art example.
Figure 5:
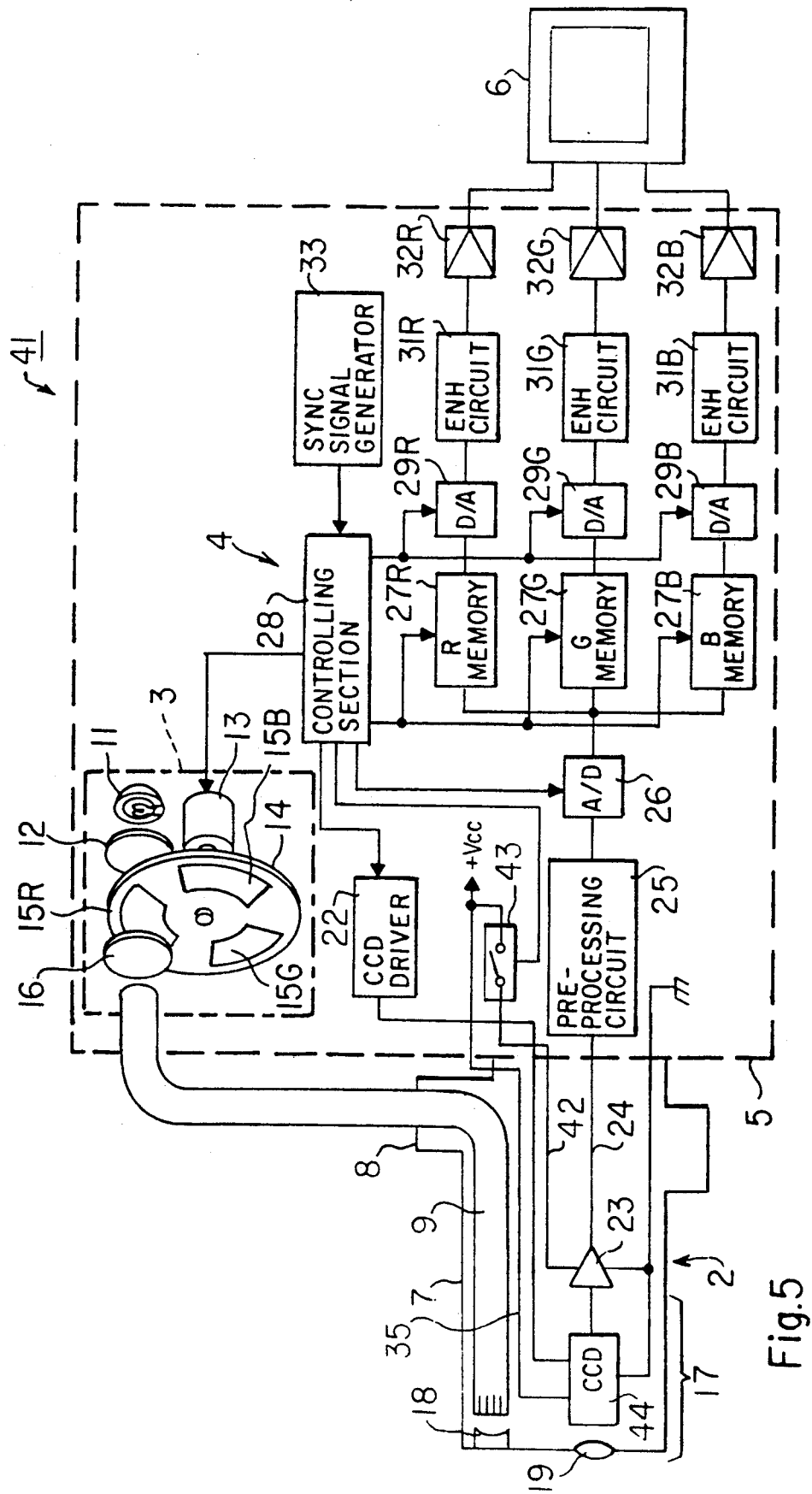
FIG. 5 is a whole formation view of the first embodiment.

As shown in FIG. 5, in an electronic endoscope apparatus 41 as an imaging apparatus of a first embodiment, the power source end of the buffer amplifier 23 in the prior art example shown in FIG. 1 is connected to one end of a switch 43 provided within the video processor 5 through a power source cable 42 inserted through the scope 2 and the other end of this switch 43 is connected to a power source end Vcc. This switch 43 is switched on/off, for example, by a switching control signal from the controlling section 28.

Also, a CCD 44 schematically shown in FIG. 6 is used instead of the CCD 21 shown in FIG. 1.

As explained in the description of the related art, the solid state imaging device (CCD 44 in this embodiment) is required to be of a size which can be housed within the thin short scope tip section 17. Therefore, in this embodiment is used a CCD 44 adapted to a small type and shown in FIG. 6.

This CCD 44 is of a virtual phase structure, has an electrode of a monolayer structure, uses its own peculiar method requiring no OFD (overflow drain) in inhibiting blooming, is the smallest among the now realized image sensors and has an advantage that the increase of the dark current by the temperature rise is less than in CCD's of other systems.

In FIG. 6, an image area has a function of accumulating photoelectrically converted electric charges and a parallelly transferring function so that a pixel part in each line in the horizontal (lateral) direction may be transferred in the vertical direction by applying a parallel transferring clock $\phi$ P and the electric charge of the pixel part in the lowermost line may be transferred to a serial register. The charge of each pixel transferred to this serial register is converted to a voltage signal by means of a charge detecting amplifier 50 by applying a serial transferring clock $\phi$ S and the voltage signal is output sequentially to the base of a transistor 34 forming the buffer amplifier 23 from the signal output end.

By the way, the image area is provided with a light-shielded dark reference area in order to give a reference value of a black level.

Also, in the image area, blooming is inhibited by an anti-blooming signal $\phi$ ABG.

The serial transferring signal is applied also to a gate for transferring to a dump drain the charge remaining in the serial register.

The power source end of said charge detecting circuit 50 of the CCD 44 is connected with a power feeding line 35, a power source voltage Vcc is applied and the substrate is connected to the GND.

Figure 3:
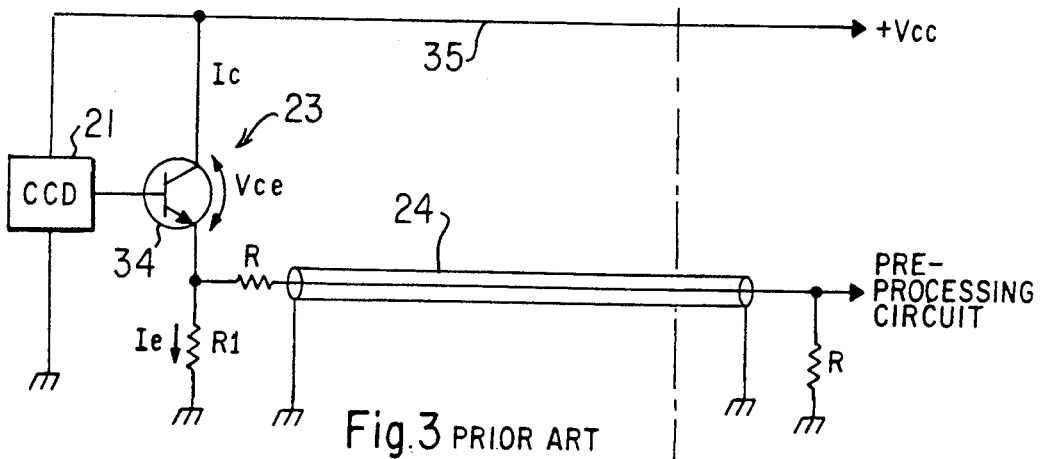
FIG. 3 is a schematic formation view of a signal transmitting system in the prior art example.

The formation of a transmitting system transmitting to the video processor 5 side the signal output from the CCD 44 is similar to what is shown in FIG. 1, (the power transmitting end side is similar to what is shown in FIG. 3).

Figure 4:
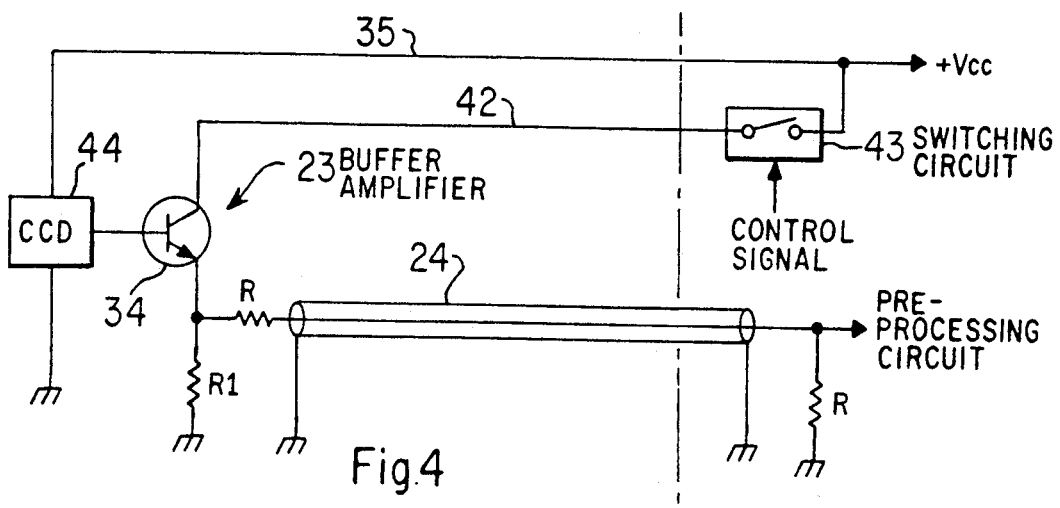
FIG. 4 is a schematic formation view of a signal transmitting system of a CCD output signal in a first embodiment of the invention.

In the transmitting system shown in FIG. 4, a CCD 44 is used instead of the CCD 21 in the transmitting system shown in FIG. 3 and the collector of a transistor 34 is connected to the power source end Vcc through a power feeding line 42 and a switching circuit 43.

The switching circuit 43 may be formed of a bipolar transistor 51 and a resistance 52 as shown, for example, in FIG. 7a or of a field effect type transistor (FET) 53 as shown in FIG. 7b.

The collector of the transistor 51 is connected to the power source end Vcc, the emitter is connected to the collector of the transistor 34 forming the buffer amplifier 23 through a power feeding line 42 and the base is connected with the controlling section 28 through a resistance 52. This controlling section 28 switches on/off the transistor 51 by the control signal shown in FIG. 8d. The control signal is synchronized with the signal reading out period shown in FIG. 8c so as to feed the electric power to (the transistor 34 of) the buffer amplifier 23 or to stop feeding the power.

That is to say, in the period of reading out the signal, the transistor 51 will be switched on, will feed the power to the transistor 34 and will perform the inherent function of the buffer amplifier 23 (the function of amplifying the current so as to be able to transmit the signal to the signal receiving side through the coaxial cable 24). In another period (mentioned as a non-reading out period) than the period of reading out the signal, the transistor 51 will be switched off, no power will be fed, to the transistor 34 no current will flow between the collector and emitter of the transistor 34 and the power consumption in the buffer amplifier 23 will be possibly made substantially zero.

In case the switch 43 is formed by using the FET 53 shown in FIG. 7b, the drain of the enhancing type MOS type FET, for example, of an N channel will be connected to the power source end Vcc, the source will be connected to the buffer amplifier 23 through the power feeding line 42, the gate will be connected to the controlling section 28 and the source and drain will be switched on/off with each other by the control signal. The control signal may be on/off by using a jointing type FET.

The other formations are the same as in the prior art example shown in FIG. 1 and the same components are represented by the same reference numerals.

The operation of this first embodiment shall be explained in the following.

This first embodiment is the electronic endoscope apparatus 41 of the frame sequential system. As shown in FIG. 8a, when considered with FIG. 5, as the rotary color filter 14 is rotated by the motor 13 as synchronized with a vertical synchronizing signal, the object will be illuminated sequentially by the color lights of R, G and B transmitted through the color transmitting filters 15R, 15G and 15B, and therefore the electric charges of the component images will be accumulated under these respective color lights in the CCD 44. These are shown by an R exposure, a G exposure and a B exposure in FIG. 8b. The respective light shielding periods when the color transmitting filters 15R, 15G and 15B are not interposed in the illuminating light path will be signal reading out periods for reading out the electric charges accumulated in the CCD as shown in FIG. 8c and the electric charges will be read out of the CCD 44 by a driving signal from the CCD driver 22.

The state shown in FIGS. 8b and 8c shows the case where the exposing period and the signal reading out period are substantially equal to each other, that is, each of the exposing period and the signal reading out period is substantially 50% of the total period combining them.

As synchronized with said signal reading out period which the controlling section 28 outputs a control signal shown in FIG. 8d to the switching circuit 43, switches on the switching circuit 43 only in the signal reading out period. The switching circuit 43 when turned on feeds electric power to the buffer amplifier 23, which amplifies the current of the signal read out from the CCD 44 to convert the read out signal into a low impedance and signal which is transmitted through the coaxial cable 24 to the pre-processing circuit 25 connected to the signal receiving end. This transmitted signal is processed in the signal processing section 4 to be converted to a standard video signal and the object image is color-displayed in the color monitor 6.

When this signal reading out period becomes an exposing period (or a non-reading out period), the switching circuit 43 will be switched off, no electric power will be fed to the buffer amplifier 23 and the power consumption in the buffer amplifier 23 in this period will be substantially zero. As the signal reading out period is substantially equal to the non-reading out period, the power consumption in the buffer amplifier 23 will be possibly reduced to substantially ½ that in the conventional example and the heat generation will be possibly reduced to a value corresponding to the reduced level of power consumption in the buffer amplifier 23.

The heat generation in this buffer amplifier 23 can be reduced so greatly that the CCD 44 arranged near this buffer amplifier 23 can be prevented effectively from being heated and undergoing a rise in temperature.

Therefore, according to this first embodiment, the increase of the dark current in the CCD 44 can be inhibited, the deterioration of the video signal can be prevented and an image high in S/N (signal/noise) may be obtained. Also, as the temperature rise can be inhibited, the CCD 44 will be possibly prevented from being heated to a level above the maximum rated temperature, being damaged by the heat and thereby having a shortened life. Further, there are advantages in reducing the power consumption and improving the S/N ratio.

By the way, even though the power feed to the buffer amplifier 23 is stopped during the non-signal reading out period, it will not be necessary to transfer the signal, and therefore there will be no problem. However, in case, for example, the non-signal reading out period is switched over to the signal reading out period or vice versa, if a transcendent part is generated in the power source voltage fed to the buffer amplifier 23 and spike-like noises are generated in the transmitted signal, as shown in FIG. 8d', the control signal may be made active a little before the signal reading out period and may be kept active until some time elapses after the signal reading out period. In such case, even if spike-like noises are generated in the transmitting system, no signal will be taken in and therefore there will be no trouble.

Also, as shown in FIG. 9, an integrating circuit 55 preventing the generation of spike-like noises may be provided at the load side terminal of the switching circuit 43. In such case, the control signal to the switching circuit 43 may be as in FIG. 8d', the rise may be the same as in FIG. 8d' and the fall may be made to coincide with that in FIG. 8d.

Figure 10:
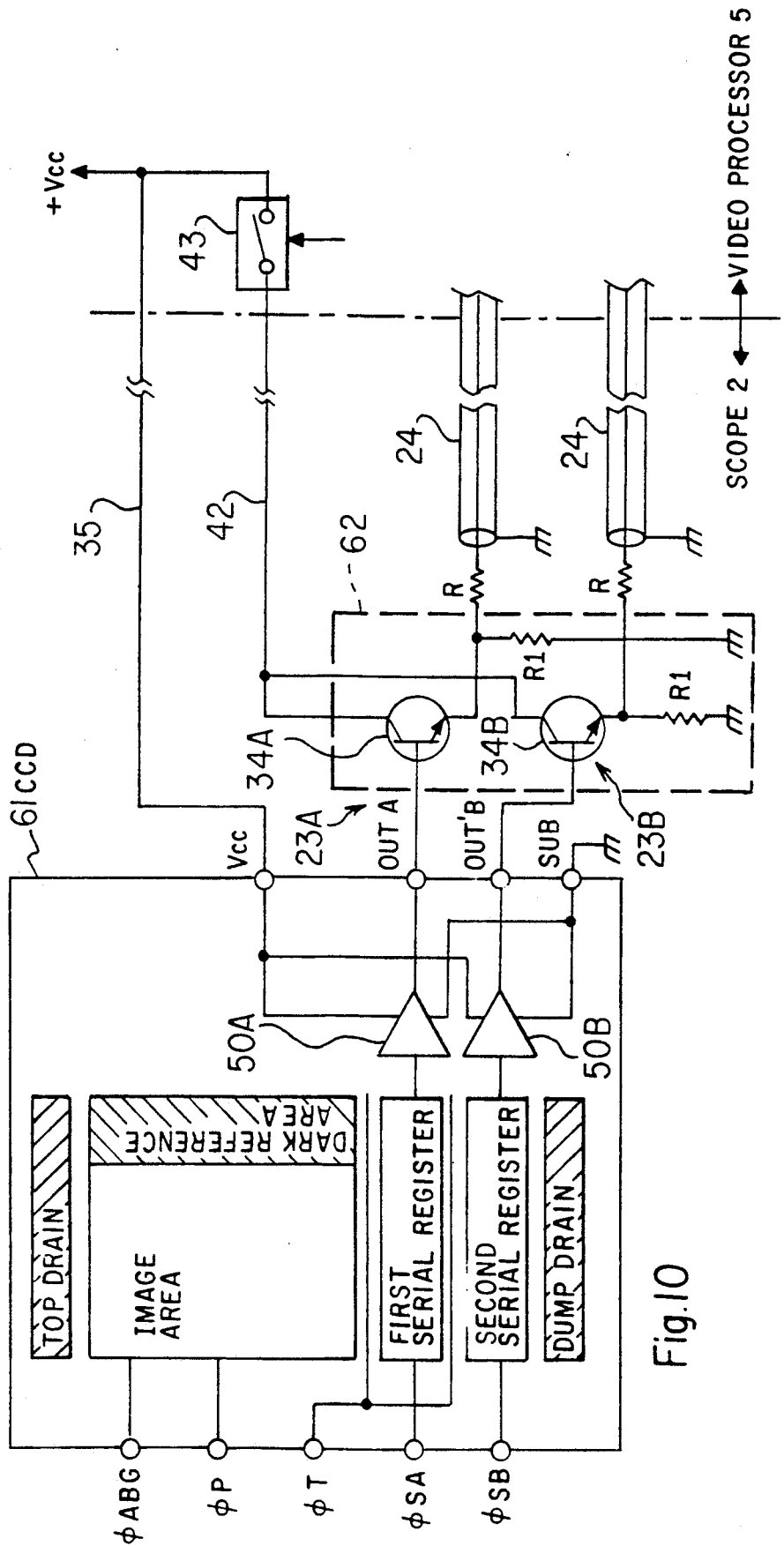
FIG. 10 is a formation view showing the peripheral part of an imaging means in a second embodiment of the present invention.

FIG. 10 shows an imaging system and buffer means in the second embodiment of the present invention.

In this second embodiment, a CCD 61 shown in FIG. 10 is used instead of the CCD 44 in the first embodiment shown in FIG. 4 and a buffer amplifier 62 corresponding to this CCD 61 is used.

The CCD 61 shown in FIG. 10 is a higher pixelized CCD by the same virtual phase structure as of the CCD 44 shown in FIG. 6. Generally, in the electronic endoscope apparatus (or system) of the frame sequential system, the time of the illumination to the object within the body cavity is determined by the reading out time from the CCD and therefore this reading out time determines the brightness of the image obtained directly by the system.

The CCD 61 of this embodiment is provided with two serial registers designated as first and second serial registers so that the reading out time may be reduced while retaining a high pixel content.

Odd number pixels and even number pixels of the respective lines of the image area are transferred respectively to these first and second serial registers, with the transferred odd number pixels and even number pixels being sequentially serially transferred respectively by serial transferring clocks $\phi$ SA and $\phi$ SB. The outputs of the first and second serial registers are respectively provided to a first buffer amplifier 23A and a second buffer amplifier 23B from signal output ends OUT A and OUT B through electric charge detecting circuits 50A and 50B.

The first and second buffer amplifiers 23A and 23B are of the same circuit formation. A buffer amplifier 62 is formed by providing two buffer amplifiers 23 of the first embodiment.

The collectors of both transistors 34A and 34B forming the first and second buffer amplifiers 23A and 23B are connected with each other and are connected to one end of a switching circuit 43 within the video processor 5 through a power source cable 42. The other end of this switching circuit 43 is connected to a power source end Vcc.

As in the first embodiment, this switching circuit 43 is controlled to be on/off by a control signal from the controlling section 28.

In this second embodiment, by using two serial registers, the reading out time can be reduced to be half that of the case of one serial register, the illuminating period (exposing period) is elongated and the reflected light amount from the object may be increased to obtain a bright image with a high S/N ratio.

Since two serial registers are provided, the first and second buffer amplifiers 23A and 23B are required, and the power consumption or heat generation attributed to the two buffer amplifiers 23A and 23B is twice as large as in the case of one buffer amplifier 23.

In this embodiment, the respective collectors of the transistors 34A and 34B forming respectively the first and second buffer amplifiers 23A and 23B are connected to the power source end Vcc through the switching circuit 43 so as to be on in at least the signal reading out period to feed the electric power and to be off in the non-reading out period to stop feeding the electric power and reduce the heat generation as in FIG. 8d or 8d'.

The amplified current signals in said respective buffer amplifiers 23A and 23B are input into the signal processing section within the video processor 5 respectively through coaxial cables 24A and 24B.

In the signal processing section of this embodiment, there are, for example, two pre-processing circuits (not illustrated) for producing base band signals are The baseband signals processing are then processed by sampling with the sample holding timing displaced by a half pixel part. The resultant signals then are added together to produce one line of pixel signals which are temporarily written into the respective memories 27R, 27G and 27B through the A/D converter 26 shown in FIG. 5.

The other formations are the same as in the first embodiment.

According to this second embodiment, the increase of the dark current which will be likely to become conspicuous, particularly where the number of pixels is large, and the temperature rise by the increase of the heat generation can be effectively prevented.

By the way, the switching circuit 43 in the first and second embodiments is not limited to be the one shown in either FIGS. 7a and 7b but a general purpose analog switch making it an IC may be used. Also, in case the voltage drop by the on-resistance of the switching circuit 43 when the switching circuit 43 is switched on is a problem, a mechanical relay having an electric contact may be used.

Figure 11:
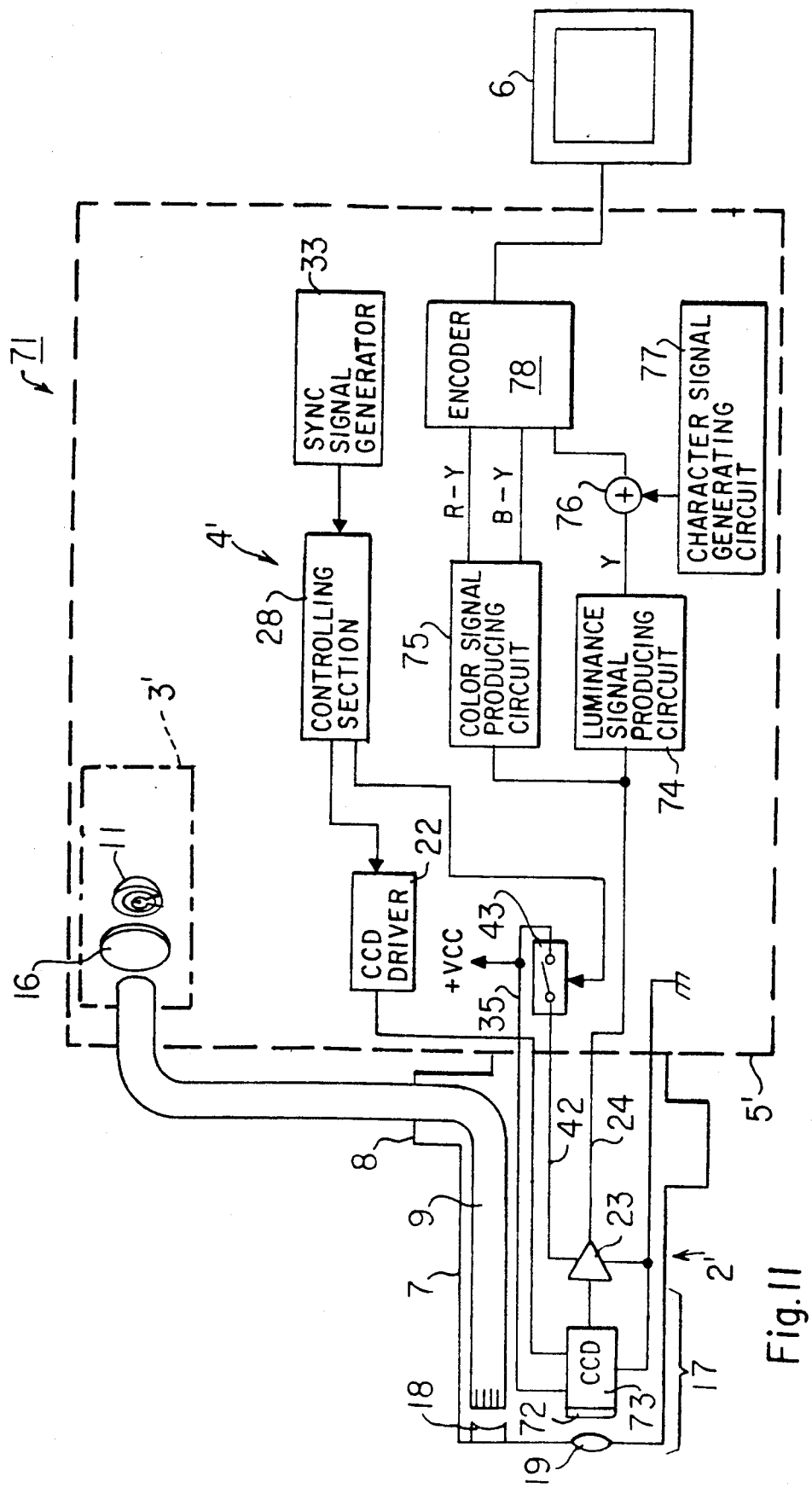
FIG. 11 is a whole formation view of a third embodiment.

FIG. 11 shows an electronic endoscope apparatus 71 of the third embodiment of the present invention.

This third embodiment is similar to the first embodiment shown in FIG. 5, but is provided with a simultaneous type electronic scope 2' having a mosaic filter 72 fitted CCD 73 built-in instead of the monochromatic CCD 44, a video processor 5' including a white light emitting light source section 3' instead of the frame sequential color light emitting light source section 3 and a simultaneous system signal processing section 4' instead of the frame sequential system signal processing section 4, and a color monitor 6.

The light source section 3' feeds a white light from a light source lamp 11 through a light guide 9 by at one end of the light guide 9 a condenser lens 16. An object illuminated by the white light transmitted by this light guide 9 and emitted from the other end thereof is made to form an image on CCD 73 by an objective lens 19. This formed optical image is optically separated in colors by color separating filters.

Then the optical image is read out of the CCD 73 by a driving signal from a CCD driver 22 and is input into a luminance signal producing circuit 74 and a color signal producing circuit 75 within the signal processing section 4' through a buffer amplifier 23 and coaxial cable 24 to respectively produce a luminance signal Y and color difference signals R-Y and B-Y. The luminance signal is added to a character signal from a character signal generating circuit 77 by a mixer 76 and the composite luminance-character signal is input together with the color difference signals R-Y and B-Y and a synchronizing signal into an encoder 78. The signals are then converted to a composite video signal which is input into the color monitor 6.

In this embodiment, the lamp 11 always emits a light and the object is always illuminated through the light guide 9. Therefore, the CCD 73 used in this embodiment is an interline transferring type CCD provided in the image area with a vertical transferring register and is of a type making a vertical transfer per field.

In the monitor displaying example in this embodiment, as shown in FIG. 12(a), an endoscope image 81 is displayed in the rightward central part of a monitor picture, and patient data and other data can be displayed on the left side through the character signal generating circuit 77.

Also, as in the first embodiment, the power feed to the buffer amplifier 23 amplifying the output signal of the CCD 73 is controlled through a switching circuit 43.

In the operation of this embodiment, as shown in FIG. 13b, the CCD 73 is always exposed.

On the other hand, as synchronized with the vertical synchronizing signal shown in FIG. 13a, at the timing T1 displaying the endoscope image 81 in FIG. 12(a), a driving signal reading out a signal for one field is applied to the CCD 73. This timing T1 corresponds substantially to T1 in FIG. 12(a). At the timing of T2 ending the display of the endoscope image 81, the driving signal will be no longer output.

This period from T1 to T2 is a signal reading out period shown in FIG. 13c. As synchronized with this signal reading out period, as shown in FIG. 13d, a control signal is output, and electric power is fed to the buffer amplifier 23 with the signal output from the CCD 73 is amplified and transmitted to the signal receiving side through the coaxial cable 24.

In the, no signal is read out period not reading out, no control signal is output, no power is fed to the buffer amplifier 23, and therefore the power consumption is substantially zero.

By the way, even in the non-reading out period, the patient data is output and the monitor picture is as shown in FIG. 12a.

The effects of this third embodiment are substantially the same as in the first embodiment.

As explained in the first embodiment, in connection with the control signal waveform of FIG. 8d' in case a control signal is output in coincidence with the signal reading out period, and spike-like noises mix into the transmitted signal, a modified control signal such as is shown in FIG. 13d' may be employed. Alternatively, as shown in FIG. 12(d'), the rise and fall of the control signal as output may be made slow to inhibit the generation of the spike-like noises.

By the way, as understood from FIG. 12(a), as the endoscope image 81 is displayed on the right side in the horizontal direction, the video signal corresponding to this endoscope image will be output in the rear half part of each horizontal period and no signal will be output from the CCD 73 on the front half part side.

Therefore, even in the control signal output period shown in FIG. 13d, as shown in FIG. 12(d), the control signal may be output only in the period (from the time t1 to t2) in which the video signal corresponding to the endoscope image 81 is actually read out of the CCD 73.

In the respective embodiments, heretofore described the power source cables 35 and 42 are required for the respective CCD's 44, 61 and 73 and buffer amplifiers 23 and 62 and must be inserted through the endoscope. Also, as the emitter resistance R1 of the buffer amplifiers 23 and 62 is provided near the CCD's 44, 61 and 73, the power consumption $Ie \times R1$ will be generated in this resistance R1.

An improvement with respect to these two aspects is provided by this embodiment.

For example, the emitter resistance, R1 in the first embodiment, is moved (the moved resistance is represented by R1' in FIG. 14) to the signal receiving end side within the video processor 5 so that the heat generation by the power consumption in this resistance R1' may have no influence on the CCD 44, and the switching circuit 43 is provided in series with the resistance R1' to eliminate the power source cable 42.

That is to say, the coaxial cable 24 is grounded at the signal receiving end through the series circuit of the switching circuit 43 and emitter resistance R1', and the contact of this switching circuit 43 and resistance R1' is connected to the input end of the pre-processing circuit 25 through a direct current preventing condenser C1.

On the other hand, the collector of the transistor 34 forming the buffer amplifier 23 is connected to the power source cable 35.

The other formations are the same as in the first embodiment.

According to this formation, while the signal is being read out, the output signal of the CCD 44 will be converted to be of a low impedance by the transistor 34 forming the buffer amplifier 23 and will be fed to a driven device comprising a resistance R1', condenser C1 and resistance R through the coaxial cable 24 and switching circuit 43. Here, the resistance R1' corresponds to the emitter resistance R1 in the first embodiment and is to flow a direct bias current for operating the buffer amplifier linearly.

On the other hand, the condenser C1 and resistance R in series with this resistance R1' become end resistances (end devices) for receiving an alternating current component, that is, the output signal of the CCD 44.

In this embodiment, the power source cable 35 also uses the coaxial cable 24 for transmitting signals on the video processor 5 side as a flow path of a bias current so that, when the switching circuit 43 connected to the signal receiving end of the coaxial cable 24 is switched on/off, the power feed to the buffer amplifier 23 may be controlled; when the switching circuit is on, the inherent buffer function may be made and, when it is off, substantially no power may be fed.

Therefore, this fourth embodiment not only has the effects of the first embodiment but also has a further effect in that two aspects of the first embodiment can be improved.

This fourth embodiment has been applied to the first embodiment but it is apparent that it can be applied also to the other embodiments.

Figure 15:
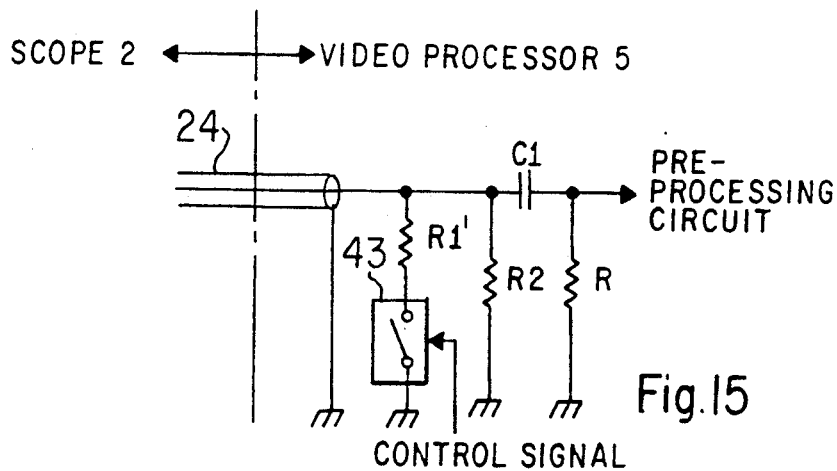
FIG. 15 is a circuit diagram showing the peripheral part of a signal receiving end of a signal transmitting system in a fifth embodiment of the present invention.

FIG. 15 shows an essential part of the fifth embodiment of the present invention.

In the above described embodiments, in case the power to the buffer amplifier 23 or 62 is switched on/off so as to coincide with the signal reading out period, strictly considering, at the time of switching the power on/off, the buffer amplifier 23 or 62 will make a transitional operation different from the constant operation which will be likely to influence the signals read out of the CCD's 44, 61 and 73.

This fifth embodiment provides an improvement with respect to this aspect.

In the fifth embodiment shown in FIG. 15, the switching circuit 43 is moved to be between the resistance R1' and ground, and a resistance R2 of a resistance value larger than the resistance R1' is provided in parallel with the resistance R1' and switching circuit 43.

In this formation, in the non-reading out period, as shown in FIG. 15, the switching circuit 43 will be off and the bias current will flow through the resistance R2 in the relation of R1'<R2.

On the other hand, at the time of reading out a signal, the switching circuit 43 will be on and a normal bias current will flow through a parallel synthesized resistance of the resistances R1' and R2 so that a transcendent operating state may be inhibited from being produced when the switching circuit 43 is switched on/off.

By the way, as apparent also from this operation, the resistance R1' in FIG. 14 corresponds to the parallel synthesized resistance of the resistances R1' and R2. Instead of operating as in FIG. 15, in FIG. 14 the power may be constantly changed when the switching circuit 43 is switched off from on, or the reverse.

Figure 16:
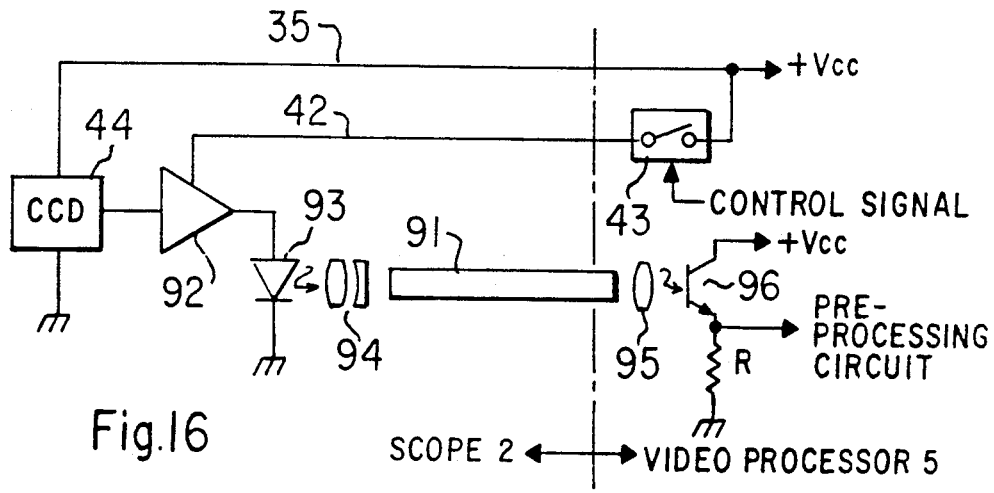
FIG. 16 is a formation view showing a signal transmitting system part in a sixth embodiment of the present invention.

In the above described respective embodiments, a signal is transmitted as an electrical signal but, in the sixth embodiment shown in FIG. 16, a signal may be transmitted as an optical signal by using a fiber cable 91.

The current of the output signal of the CCD 44 is amplified by a current boosting circuit 92, with the amplified output signal being fed to a light emitting device such as an LED 93 where the electrical output signal is converted to an optical signal. The optical signal from the LED 93 is condensed by a lens 94, is fed to a fiber cable 91 at one end, is transmitted by this fiber cable 91 to the other end connected to the video processor, is condensed by a lens 95 arranged as opposed to the other end of the fiber cable, is received by a light receiving device such as a phototransistor 96 and is photoelectrically converted. The collector of the phototransistor 96 is connected to a power source end Vcc and the emitter is ground through a resistance r and is connected to the input end of the pre-processing circuit 25.

By the way, in a manner similar to the first embodiment, the power source end of the current boosting circuit 92 is connected to one end of the switching circuit 43 within the video processor 5 through a power source cable 42.

This sixth embodiment has substantially the same operation and effect as the first embodiment.

Figure 17:
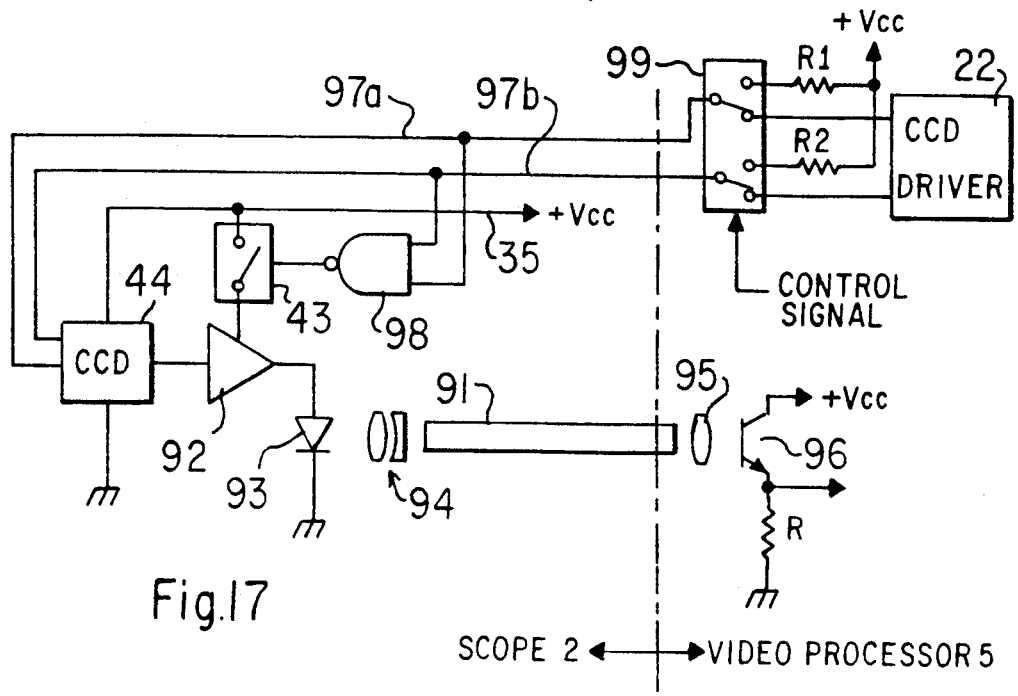
FIG. 17 is a formation view showing an essential part of a modification of the sixth embodiment of the present invention.

In a modification of the sixth embodiment, shown in FIG. 17, the switching circuit 43 may be moved to the scope side and may be driven, for example, through a NAND gate 98 by a switching signal utilizing driving signal lines 97a and 97b driving the CCD 44.

The signal lines 97a and 97b which may to transmit, for example, a vertical transferred clock and a horizontal transferred clock, are signal lines having no period in which both signals will become "H" in case the CCD 44 is driven. The signal lines 97a and 97b are connected to a CCD driver 22 and power source end Vcc (through resistances r1 and r2) through a switching switch 99 within the video processor 5. This switch 99 is switched by a control signal, with the driver 22 side being selected in the signal reading out period. There is no signal level period in which both signals are "H" in this state, the output of the NAND gate 98 is "H", the switching circuit 43 remains on and electric power is fed to the current boosting circuit 92.

On the other hand, in the non-reading out period, as the switch 99 is switched to the power source end Vcc side, the output of the NAND gate 98 will be "L", the switching circuit 43 will be "OFF" and the power consumption in the current boosting circuit 92 will be substantially zero.

According to this modification, the power source cable 42 may be omitted.

FIG. 18 shows an essential part of the seventh embodiment of the present invention.

In the above described embodiments (except for the modification of the sixth embodiment), shown in FIG. 17 the switch for switching the power consumption of the buffer amplifier is provided on the video processor side but, in the embodiment, of FIG. 18 it is provided within the scope.

As shown in FIG. 18, in the buffer amplifier 23 shown in FIG. 4, the collector of the transistor 34 is connected to the power source end Vcc and the resistance R1 connected with the emitter is grounded through the resistance R3 and is grounded through the switch 43.

The resistance R3 is set under the condition of R3>R1 so that, when a signal is read out of the CCD 44, the switch 43 will be on and the resistance R3 will be shorted but, when no signal is read out, the switch 43 will be off. The other formations are the same as in the first embodiment.

In this seventh embodiment, in case the switch 43 is on, the operation will be the same as in the first embodiment. On the other hand, when no signal is read out, the switch 43 will be off, and the resistance R3 having a valve larger than the resistance R1 will be connected in series with the resistance R1. Therefore, the current running through the transistor 34 will be restricted and, as a result, the power consumption will be reduced.

FIG. 19 shows an essential part of the eighth embodiment of the present invention.

This embodiment is to provide a switch 43 on the scope side in the embodiment shown in FIG. 14 or 15.

For example, in FIG. 14, the switch 43 within the video processor 5 is removed and a switch 43 is provided in parallel with a resistance R4 provided in series with the resistance R connected with the emitter of the transistor 34 forming the buffer amplifier 23 within the scope 2.

The resistance R4 is set under the condition of R4>R so that, when a signal is read out of the CCD 44, the switch 43 will be on and the resistance R4 will be shorted but, when no signal is read out, the switch 43 will be off. The other formations are the same as in the first embodiment.

In this eighth embodiment, in case the switch 43 is on, the operation will be the same as in the fourth embodiment. On the other hand, when no signal is read out, the switch 43 will be off, the resistance R4 having a valve larger than the resistance R will be connected in series with the resistance R. Therefore, the current running through the transistor 34 will be restricted and, as a result, the power consumption will reduced.

In the seventh embodiment and the eighth embodiment, the switch 43 may be provided just near the CCD 44, that is, within the tip section or in the connector of the scope 2.

FIG. 20 shows an essential part of the ninth embodiment of the present invention.

In this embodiment, when no signal is read out, the value of the power source voltage fed to the buffer amplifier 23 will be reduced to reduce the power consumption.

The collector of the transistor 34 forming the buffer amplifier 23 within the scope 2 is connected to the power source output end of a suitable variable voltage three-terminal regulator 85 through a power feeding line. The voltage variable terminal of this three-terminal voltage regulator 85 is grounded through a series circuit of resistances R5, R6 and R7. The connecting point of the resistances R5 and R6 is connected to the output end of the voltage regulator 85. A switch 43 is connected in parallel with the resistance R7.

The voltage output Vout from the output end of the three-terminal voltage regulator 85 is determined by the ratio of the resistance R5 to the resistances R6+R7 in series.

In this embodiment, when a signal is read out of the CCD 44, the switch 43 will be on, the resistance R7 will be shorted and electric power will be fed to the buffer amplifier 23 at a normal set voltage Vcc.

On the other hand, when no signal is read out, the switch 43 will be off, and electric power will be fed to the buffer amplifier 23 at a voltage lower than the normal set voltage Vcc with a corresponding reduction in the power consumption in this state.

In this embodiment, the three-terminal voltage regulator 85 or the like is provided within the video processor 5 but it is apparent that it may be provided within the scope 2 as in the seventh embodiment or the eighth embodiment.

By the way, in the respective embodiments of the frame sequential system, the control signal for switching on/off the switching circuit 43 may be produced by the output of a sensor (not illustrated) for detecting the illuminating period in the rotary color filter 14.

In the tenth embodiment shown in FIG. 21, the present invention may also be applied to an external scope 103 of a television camera 102, with the scope 103 being connected in the eyepiece section of a fiber scope 101 instead of an electronic scope.

In the fiber scope 101, for example, in the end of an image guide 104 is arranged in the focal plane of the objective lens 19 within the insertable section 7 and the optical image formed in the focal plane by this image guide 104 is transmitted to the other end on the operating section 8 side. An eyepiece section 105 is formed at the rear end of this operating section 8. The optical image transmitted to the other end of the image guide 104 can be observed with the naked eye through an eyepiece lens 106 provided as opposed to the other end of said image guide 104.

An image forming lens 107 is arranged as opposed to said eyepiece lens 106 within the television camera 102 removably connected to said eyepiece section 105 so that an optical image may be formed on a CCD 73 fitted with a mosaic filter 72 through the eyepiece lens 106 and the image forming lens 107. As in the embodiment shown in FIG. 11, the output signal of the CCD 73 provided as an input to the buffer amplifier 23 arranged near said CCD 73.

The coaxial cable 24 or the like transmitting the output signal of the buffer amplifier 23 is inserted through a camera cable 108 and is connected to the video processor 5' shown in FIG. 11. By the way, the light guide 9 is inserted through a light guide cable 109 extended from the side of the operating section 8 and is connected to the light source part 3' of the video processor 5' shown in FIG. 11.

In other respects, the components of the scope 103 of the embodiment of FIG. 21 are of the same formation as the components of the electronic scope 2' shown in FIG. 11. The same components are represented by the same reference numerals.

Also, there is an advantage in that the electric power to the buffer means may be reduced even in the case of the application to any television camera provided with a buffer means.

By the way, the present invention may be applied not only to a line transferring type CCD such as the CCD's 44 and 61 of the first and second embodiments respectively shown in FIGS. 5 and 10, but also to an interline transferring type or frame transferring type. Also, the present invention may be applied to not only a CCD but also a BBD and other solid state imaging devices.

Different embodiments may be formed by combining the above described respective embodiments.

What is claimed is:

1. An imaging system comprising:
   an image-forming optical system for obtaining an optical image of an object to be imaged;
   a solid state imaging device for photoelectrically converting an optical image provided by said image-forming optical system to an image signal in the form of an electrical output signal;
   driving signal generating means connected to an input of said solid state imaging device for providing a driving signal thereto, said solid state imaging device providing an image signal from the photoelectrically converted optical image as an electrical output signal therefrom in response to the driving signal;
   buffer means for amplifying the current of the electrical output signal provided at the output of said solid state imaging device;
   a signal transmission cable connected to the output of said buffer means for transmitting the output signal therefrom;
   signal processing means connected to said signal transmission cable for producing a video signal from the output signal of said buffer means as transmitted by said signal transmission cable;
   a monitor connected to said signal processing means for displaying the video signal as produced thereby; and
   electrical current control means operably connected to said buffer means and responsive to a pause in the readout of said image signal from said solid state imaging device to reduce the electrical current as provided from an electric power source to said buffer means and responsive to readout of said image signal from said solid state imaging device as an output signal to enable electrical current to be provided from the power source to said buffer means at a normal level, whereby heat generation effected by the operation of said buffer means is controlled at a tolerable level by intermittently reducing the electrical current provided to said buffer means whenever the image signal is not being readout from said solid state imaging device.

2. A system according to claim 1 wherein said signal transmission cable is a coaxial cable.

3. A system according to claim 1 wherein said signal transmission cable is an optical cable.

4. An imaging system as set forth in claim 1, further including a housing in which said signal processing means is disposed to provide a video processor section;
   an elongated scope receivable within said housing and extending outwardly therefrom, said elongated scope including said image-forming optical system and said solid state imaging device therewithin; and
   a light source section within said housing and having illuminating light emitting means for providing an illuminating light to said image-forming optical system in said elongated scope.

5. An imaging system as set forth in claim 4, wherein said electrical current control means comprises an on/off switch within said elongated scope for interrupting the electrical current as provided from the power source to said buffer means during a pause in the readout of said image signal from said solid state imaging device.

6. An imaging system as set forth in claim 4, wherein said illuminating light emitting means of said light source section comprises an elongated light guide extending from said light source section within said elongated scope, and a light source apparatus;
   said light source apparatus providing illuminating light to one end of said elongated light guide, and said elongated light guide transmitting the illuminating light as fed to one end thereof by said light source apparatus and emitting the illuminating light from the other end of said elongated light guide for input to said image-forming optical system within said elongated scope.

7. An imaging system as set forth in claim 4, further including a color separating color mosaic filter disposed on the photoelectrically converting surface of said solid state imaging device.

8. An imaging system as set forth in claim 4, wherein said solid state imaging device is provided with two outputs from which two electrical output signals are produced during readout; and
   said buffer means comprising first and second buffer amplifiers respectively corresponding to the two outputs of said solid state imaging device for receiving the first and second electrical output signals therefrom.

9. An imaging system as set forth in claim 1, further including a television camera having a housing in which said signal processing means is disposed to provide a video processor section, said solid state imaging device also being disposed within said housing of said television camera;
   an elongated scope having an eyepiece section at one end thereof connected to said television camera and extending outwardly from the housing thereof, said eyepiece section of said elongated scope being in registration with said solid state imaging device;
   an elongated light image guide disposed in said elongated scope in optical registration with said solid state imaging device via said eyepiece section;
   said image-forming optical system being disposed in said elongated scope and having a focal plane in which one end of said light image guide is arranged; and
   a light source section within said housing and having illuminating light emitting means for providing an illuminating light to said image-forming optical system in said elongated scope.

10. An imaging system as set forth in claim 9, wherein said electrical current control means comprise an on/off switch within the housing of said television camera for interrupting the electrical current as provided from the power source to said buffer means during a pause in the readout of said image signal from said solid state imaging device.

11. An imaging system as set forth in claim 9, wherein said illuminating light emitting means of said light source section comprises an elongated light guide extending from said light source section within said elongated scope, and a light source apparatus;

said light source apparatus providing illuminating light to one end of said elongated light guide, and said elongated light guide transmitting the illuminating light as fed to one end thereof by said light source apparatus and emitting the illuminating light from the other end of said elongated light guide for input to said image-forming optical system within said elongated scope.

12. An imaging system as set forth in claim 9, further including a color separating color mosaic filter disposed on the photoelectrically converting surface of said solid state imaging device.

13. An imaging system as set forth in claim 9, wherein said solid state imaging device is provided with two outputs from which two electrical output signals are produced during readout; and said buffer means comprising first and second buffer amplifiers respectively corresponding to the two outputs of said solid state imaging device for receiving the first and second electrical output signals therefrom.

14. An imaging system as set forth in claim 1, wherein said electrical current control means comprises an on/off switch operably interposed between the power source and said buffer means, said switch being in the "off" position during a pause in the readout of said image signal from said solid state imaging device to interrupt the electrical current as provided from the power source to said buffer means and being responsive to a control signal generated when readout of said image signal from said solid state imaging device as an output signal is occurring to assume the "on" position to enable the power source to provide electrical current to said buffer means.

15. An imaging system as set forth in claim 14, further including a power feeding cable connecting said buffer means to the power source;

said on/off switch being interposed in said power feeding cable; and controlling means operably connected to said on/off switch and generating a control signal to regulate switching of said switch between "on" and "off" positions.

16. An imaging system as set forth in claim 15, wherein said on/off switch is a transistor.

17. An imaging system as set forth in claim 15, wherein said driving signal generating means includes a plurality of signal transmission cables for providing the driving signal to the input of said solid state imaging device;

said on/off switch being switched between "on" and "off" positions by a switching signal from said controlling means provided in response to signals from said plurality of signal transmission cables of said driving signal generating means during a pause in the readout of said image signal from said solid state imaging device.

18. An imaging system as set forth in claim 1, wherein said electrical current control means comprises an on/off switch disposed in a signal transmission path through which the electrical output signal having an amplified current is transmitted from said buffer means to said signal processing means via said signal transmission cable; and controlling means operably connected to said on/off switch for regulating the switching of said switch between "on" and "off" positions.

19. An imaging system as set forth in claim 18, wherein said on/off switch is a transistor.

20. An imaging system as set forth in claim 18, wherein said signal transmission cable forms the signal transmission path; and said on/off switch being disposed in series with said signal transmission cable.

21. An imaging system as set forth in claim 18, wherein said electrical current control means further includes a resistance connected in series with said on/off switch.

22. An imaging system as set forth in claim 18, wherein said electrical current control means further includes a resistance connected in parallel with said on/off switch.

23. An imaging system as set forth in claim 18, wherein said driving signal generating means includes a plurality of signal transmission cables for providing the driving signal to the input of said solid state imaging device;

said on/off switch being switched between "on" and "off" positions by a switching signal from said controlling means provided in response to signals from said plurality of signal transmission cables of said driving signal generating means during a pause in the readout of said image signal from said solid state imaging device.

24. An imaging system as set forth in claim 1, wherein said electrical current control means comprises an on/off switch within said signal processing means for interrupting the electrical current as provided from the power source to said buffer means during a pause in the readout of said image signal from said solid state imaging device.

25. An imaging apparatus comprising:

an image-forming optical system for obtaining an optical image of an object to be imaged;

a solid state imaging device for photoelectrically converting an optical image based on said image-forming optical system;

buffer means for amplifying a signal provided at the output of said solid state imaging device; and means operably connected to said buffer means and activated to a first state in response to a pause in the readout of said image signal from said solid state imaging device to reduce the power consumption in said buffer means, and said power consumption reduction means being activated to a second state when the image signal is being read out as an output signal from said solid state imaging device, whereby heat generation in said imaging apparatus effected by said buffer means is controlled at a tolerable level by intermittently reducing the power consumption of said buffer means whenever the image signal is not being read out from said solid state imaging device.

26. An imaging apparatus according to claim 25, further comprising driving signal generating means connected to an input of said solid state imaging device for generating a driving signal provided as an input to said solid state imaging device to produce an image signal photoelectrically converted by said solid state imaging device as an output therefrom.

27. An imaging apparatus according to claim 25, wherein said power consumption reducing means interrupts the driving current running through said buffer means during a pause in the readout of said image signal from said solid state imaging device.

28. An imaging apparatus according to claim 25, wherein said power consumption reducing means lowers the driving current running through said buffer means during a pause in the readout of said image signal from said solid state imaging device.

29. An imaging apparatus according to claim 25, further comprising a signal transmission cable transmitting the image signal means by said buffer amplifier.

30. An imaging apparatus according to claim 29, further comprising signal processing means connected to said signal transmission cable for processing the image signal transmitted by said signal transmission cable to produce a video signal.

31. An imaging apparatus as set forth in claim 25, further including an elongated scope in which said image-forming optical system and said solid state imaging device are disposed; and
 a light source section having illuminating light emitting means for providing an illuminating light to said image-forming optical system in said elongated scope.

32. An imaging apparatus as set forth in claim 25, further including an elongated scope having an eyepiece section at one end thereof;
 a light image guide disposed in said elongated scope;
 a light source section having illuminating light emitting means for providing an illuminating light to said image-forming optical system in said elongated scope;
 said image-forming optical system having a focal plane in which one end of said light image guide is arranged; and
 a television camera having a housing in which said solid state imaging device is disposed, said television camera being connected to the eyepiece section of said elongated scope.

33. An imaging system comprising:
 an image-forming optical system for obtaining an optical image of an object to be imaged;
 a solid state imaging device for photoelectrically converting an optical image provided by said image-forming optical system to an image signal in the form of an electrical output signal;
 driving signal generating means connected to an input of said solid state imaging device for providing a driving signal thereto, said solid state imaging device providing an image signal from the photoelectrically converted optical image as an electrical output signal therefrom in response to the driving signal;
 buffer means for amplifying the electrical output signal provided at the output of said solid state imaging device;
 a signal transmission cable connected to the output of said buffer means for transmitting the output signal therefrom;
 signal processing means connected to said signal transmission cable for producing a video signal from the output signal of said buffer means as transmitted by said signal transmission cable;
 a monitor connected to said signal processing means for displaying the video signal as produced thereby; and
 power consumption control means operably connected to said buffer means and responsive to a pause in the readout of said image signal from said solid state imaging device to reduce the electrical power provided to said buffer means and responsive to readout of said image signal from said solid state imaging device as an output signal to enable electrical power to be provided to said buffer means at a normal level, whereby heat generation effected by the operation of said buffer means is controlled at a tolerable level by intermittently reducing the electrical power provided to said buffer means whenever the image signal is not being readout from said solid state imaging device.

* * * * *